(No Model.)

C. W. BERNSON.
PNEUMATIC TIRE.

No. 573,838. Patented Dec. 22, 1896.

WITNESSES:

INVENTOR:
Chas. W. Bernson
By A. P. Thayer
Attorney.

UNITED STATES PATENT OFFICE.

CHARLES W. BERNSON, OF NEW YORK, N. Y.

PNEUMATIC TIRE.

SPECIFICATION forming part of Letters Patent No. 573,838, dated December 22, 1896.

Application filed December 31, 1895. Serial No. 573,883. (No model.)

*To all whom it may concern:*

Be it known that I, CHARLES W. BERNSON, a citizen of the United States, and a resident of New York city, in the county and State of New York, have invented certain new and useful Improvements in Pneumatic Tires, of which the following is a specification.

My invention consists of an improvement in protective liners for preventing punctures of the pneumatic tubes, whereby it is made a component part of the pneumatic tube for reinforcing its tensile strength and to prevent it from twisting in the outer tube, as hereinafter described, reference being made to the accompanying drawings, in which—

Figure 1:
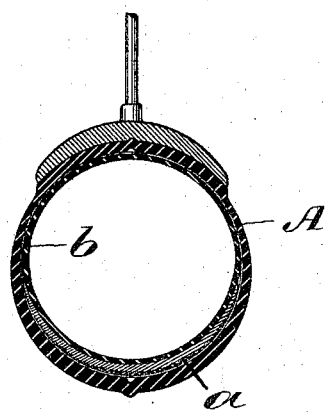
Figure 2:
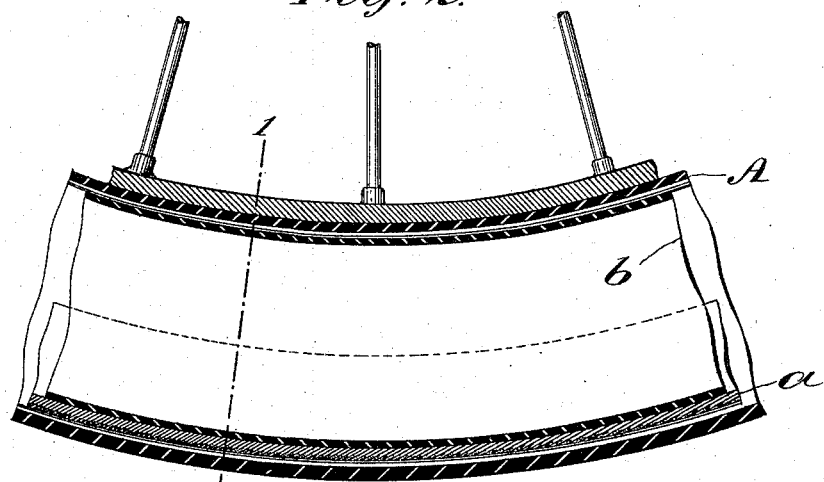
Figure 3:
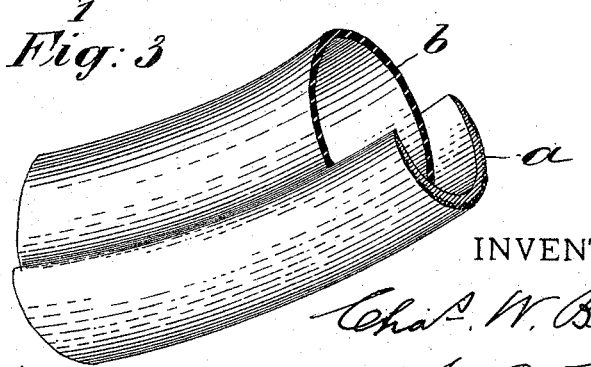

Figure 1 is a transverse sectional elevation of a portion of a pneumatic tire on line $x\ x$, Fig. 2. Fig. 2 is a longitudinal section of a portion of the tire. Fig. 3 is a perspective view of a short section of the liner and the inner tube.

A represents the exterior tube of the common form of pneumatic tires, $b$ the inner tube for holding the air, and $c$ the protective liner of my invention for preventing puncture of the air-tube $b$.

I take a strip $a$, of leather, of suitable width to cover the breadth of the tube $b$ exposed to puncture and long enough to surround the said tube when distended and form a scarfed lap-joint at the ends, or the ends may meet in a butt-joint, as preferred, and dress off the flesh side to uniform thickness lengthwise, with taper edges, then heat the leather strip and treat the dressed or shaved side with hot tar by applying with a brush as much as the pores will take up, and then mold the strip to fit the untarred side to the inner tube and cement it thereto and make it a component part thereof, comprising a puncture-proof rim intermediate of the treads of the two tubes and a stiffener to facilitate inserting the air-tube in the outer tube, also a strengthener to prevent tearing it when pulling it out of the outer tube, and also a device to prevent twisting the air-tube when inserting it in the outer tube. The tar renders the leather effectually resistant to tacks and other puncturing objects, such as are so destructible of the ordinary rubber tires.

I am aware that rawhide and dried fish-skin have been used between the outer and inner tube for protection against punctures, and I do not claim such protectors broadly. My protector is equally as effective against punctures, and has a material advantage in flexibility, besides the advantages of the connection of the protector to the inner tube independently of the outer tube, as above stated.

I am aware of the Patent No. 496,336, in which there is a protective strip surrounding the pneumatic tube and cemented along one edge to both the tire-tubes as a means of preventing the strip, which is otherwise loose, from turning and exposing the pneumatic tube to puncture between the edges of the strip, and I make no claim to such device, the use of which requires that the outer tube be split its entire length along its inner periphery for inserting and removing the pneumatic tube, whereas the puncture-strip of my invention permits of inserting and removing the pneumatic tube through the short slit of the common and preferred arrangement.

I claim—

The combination with the inner and outer tubes of a pneumatic tire, of an interposed leather puncture-preventing and strength-reinforcing strip for the pneumatic tube, said strip corresponding in width to the part exposed to puncture and being saturated with tar on its porous side, and on the other side cemented to the tread portion of the pneumatic tube covered by it substantially as described.

Signed at New York city, in the county and State of New York, this 12th day of December, A. D. 1895.

CHARLES W. BERNSON.

Witnesses:
W. J. MORGAN,
A. P. THAYER.